United States Patent [19]

Carlson et al.

[11] 4,122,719
[45] Oct. 31, 1978

[54] SYSTEM FOR ACCURATE MEASUREMENT OF TEMPERATURE

[75] Inventors: Thomas B. Carlson; Gerhard Kreikebaum, both of Knoxville, Tenn.

[73] Assignee: Environmental Systems Corporation, Knoxville, Tenn.

[21] Appl. No.: 813,951

[22] Filed: Jul. 8, 1977

[51] Int. Cl.² ............................................. G01K 7/10
[52] U.S. Cl. ............................... 73/342; 73/362 AR
[58] Field of Search ............. 73/342, 362 AR, 362 SC

[56] References Cited

U.S. PATENT DOCUMENTS

| 3,622,849 | 11/1971 | Kelley et al. | 73/342 |
| 3,978,325 | 8/1976 | Goldstein et al. | 73/362 AR |
| 4,055,166 | 10/1977 | Simpson et al. | 73/342 |

*Primary Examiner*—Anthony V. Ciarlante
*Attorney, Agent, or Firm*—Fitch, Even, Tabin & Luedeka

[57] ABSTRACT

An improved system for accurately measuring temperature. The system is microprocessor based and automatically compensates for errors from such elements as cable resistance, drift and aging of the signal conditioning electronics. The system converts a non-linear electrical signal from a probe directly to a temperature indication in degrees Celcius. In the preferred embodiment, there is employed a multiplicity of probes and the system provides for automatically scanning of the probes and computation of the temperature for each.

5 Claims, 10 Drawing Figures

SYSTEM FOR ACCURATE MEASUREMENT OF TEMPERATURE

This invention relates to precision temperature monitoring systems.

"Precision" temperature measurement as used in this disclosure refers to the measurement of temperatures to an absolute accuracy of better than ± 0.05° C. Such precision temperature measurement has heretofore commonly been confined to the laboratory or similar locations under controlled ambient environment and with consideration being given to corrective measures for error sources. Such error sources vary with the type of instrument or device employed in making the temperature measurement. For example, in liquid or gas filled glass thermometers, correction factors are applied to compensate for a portion of the thermometer being exposed to an ambient temperature other than the temperature under observation. In platinum resistance thermometers, provision is made for correcting for the length of the electrical leads inasmuch as the total measured resistance includes the resistance of such leads. Many other such considerations exist, all to the end that the state of the art of automated temperature measurement, by any means, provides an accuracy of the measurement of not better than about 0.05° C. Still, these accuracies are not attainable under commonly encountered field use conditions with present measurement devices.

The platinum resistance thermometer is one of the most accurate devices heretofore known for measuring temperature and is the device employed in the International Practical Temperature Scale of 1968 (IPTS-68). The IPTS-68 is based on the assigned values of the temperatures of the number of reproducible equilibrium states (defining fixed points) and on standard instruments calibrated at those temperatures. Interpolation between the fixed point temperatures is provided by formulae used to establish the relation between indications of the standard instruments and values of International Practical Temperature.

In use, the platinum resistance thermometer is "calibrated" at various fixed points such as the temperature of an ice bath and the boiling point of water, thereby providing a known relationship between the observed resistance at these known temperatures. By interpolation, a table of temperatures and corresponding resistances is developed for later use as a "look-up" table. Platinum resistance thermometers, however, also suffer shortcomings. For example, these instruments are subject to drift, i.e. electronic component aging, errors due to resistance in electrical leads and similar matters. Still further, as with many other instruments, the platinum resistance thermometer technique requires a "look-up table" which consumes time and affords the opportunity for operator error. Still further, the table must be compiled for a given platinum resistance temperature detector (RTD) and if a new or additional RTD is introduced into the system, a new table must be prepared.

In the platinum resistance thermometer systems presently known to the inventor, when more than one RTD (probe) is employed in the system, such as when temperature measurements are desired for spaced apart locations, employing a single electronic "control box," it has heretofore been necessary to match the two probes as concerns their electrical resistance at a selected temperature, e.g. ice point of water. Because the relatively large differences in the resistance value of probes as received from a manufacturer, the matching of probes has heretofore been both expensive and time-consuming. Further, the accuracy of these prior art systems has been partly dependent upon the accuracy of the match between the probes.

In accordance with the present disclosure, there is provided a precision temperature monitoring system with an overall system accuracy better than ± 0.05° C. for individual temperature (probes). The system is microprocessor based and automatically compensates for errors from such elements as cable resistance, drift and aging of the signal conditioning electronics. The system converts a nonlinear electrical signal from a probe (RTD) directly into a temperature indication in degrees Celcius. In the preferred embodiment, there is employed a multiplicity of probes and the system provides for automatically scanning of the probes and computation of the temperature for each. Further in the preferred embodiment at the beginning of each scan, the overall system is "calibrated" prior to making the desired temperature measurement.

In the present system in its preferred embodiment, the inventor establishes a constant current and impresses this current through a platinum resistance probe. This current source is monitored and any variance from its desired constant value is detected. An electrical signal representative of such variance is developed.

The resistance of the probe, in the form of an electrical signal having a value equal to the product of the constant current and the probe resistance at the temperature being experienced by the probe, is monitored. This electrical signal is amplified and fed to an analog to digital converter (ADC) where there is developed a digital signal which is fed to a microprocessor. The drift in the "zero" and the drift in the "span" (i.e. full scale) of the ADC are monitored and a separate electrical signal representative of each of these drifts is developed and fed to the microprocessor. The electrical signal representative of the constant current variance is also fed to the microprocessor.

Within the microprocessor, employing an algorithm which closely approximates the Callendar Van Dusen equation, the resistance of the probe is converted to temperature and the result is displayed and/or printed out.

Further in accordance with the invention, each probe is checked at the time it is initially placed in the system to ascertain its specific, inherent constants $R_.$ and alpha ($\alpha$) (see Eq. 1 hereinafter). The constants for each probe are encoded in dip switches until the system read out equals the correct temperature, thereby assuring that the accuracy of the probe at least equals the accuracy of the system. By this means, probe interchangeability is maximized from the standpoints of efficiency and economy.

It is therefore an object of this invention to provide an improved system for precision temperature measurement. It is another object to provide a system of the type described which accommodates a multiplicity of temperature probes. It is another object to provide a system of the type described wherein sources of potential errors arising within the measurement are automatically monitored and compensation made therefor prior to providing an indication of the temperature under consideration. It is another object to provide a system of the type described wherein there is maximum interchangeability of temperature probes.

Other objects and advantages of the invention will be recognized from the following description including the specifications, claims and drawings in which:

Figure 1:
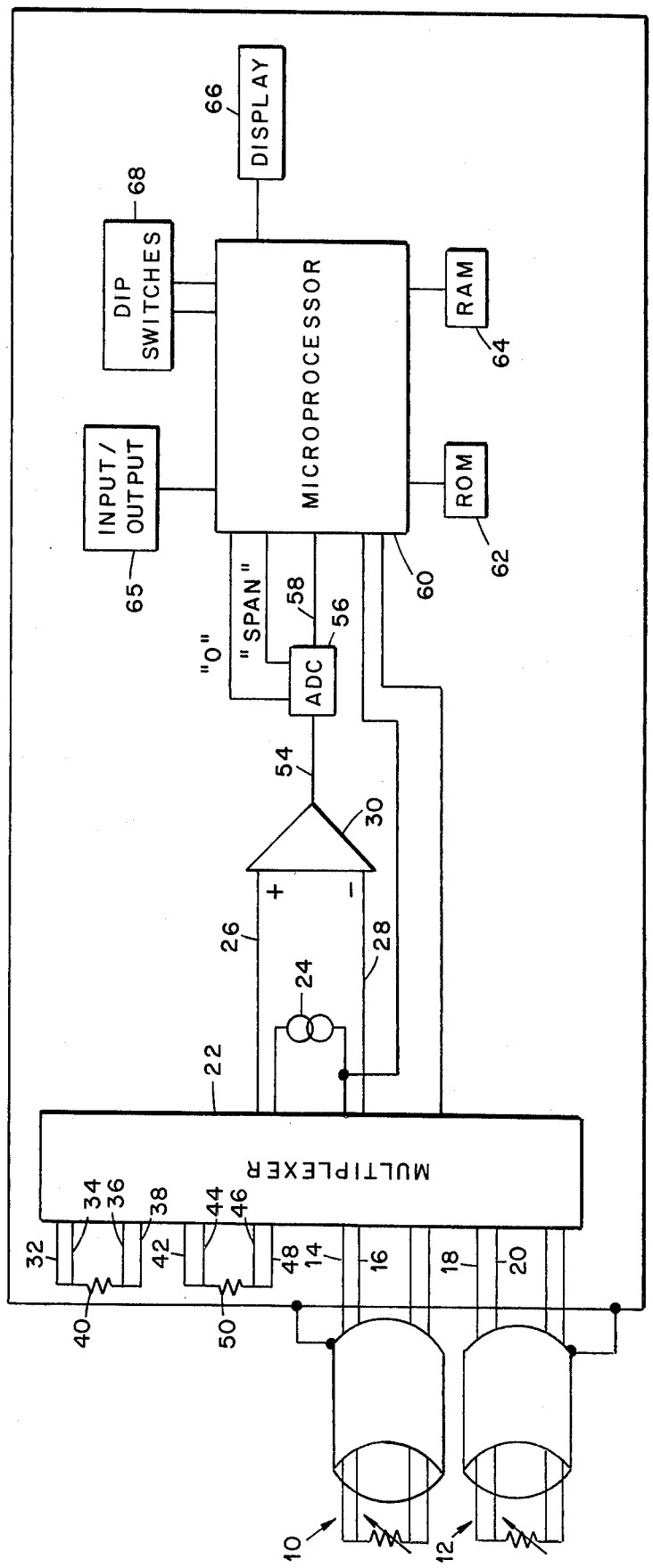
FIG. 1 is a schematic representation of a system employing various features of the invention.
Figure 6:
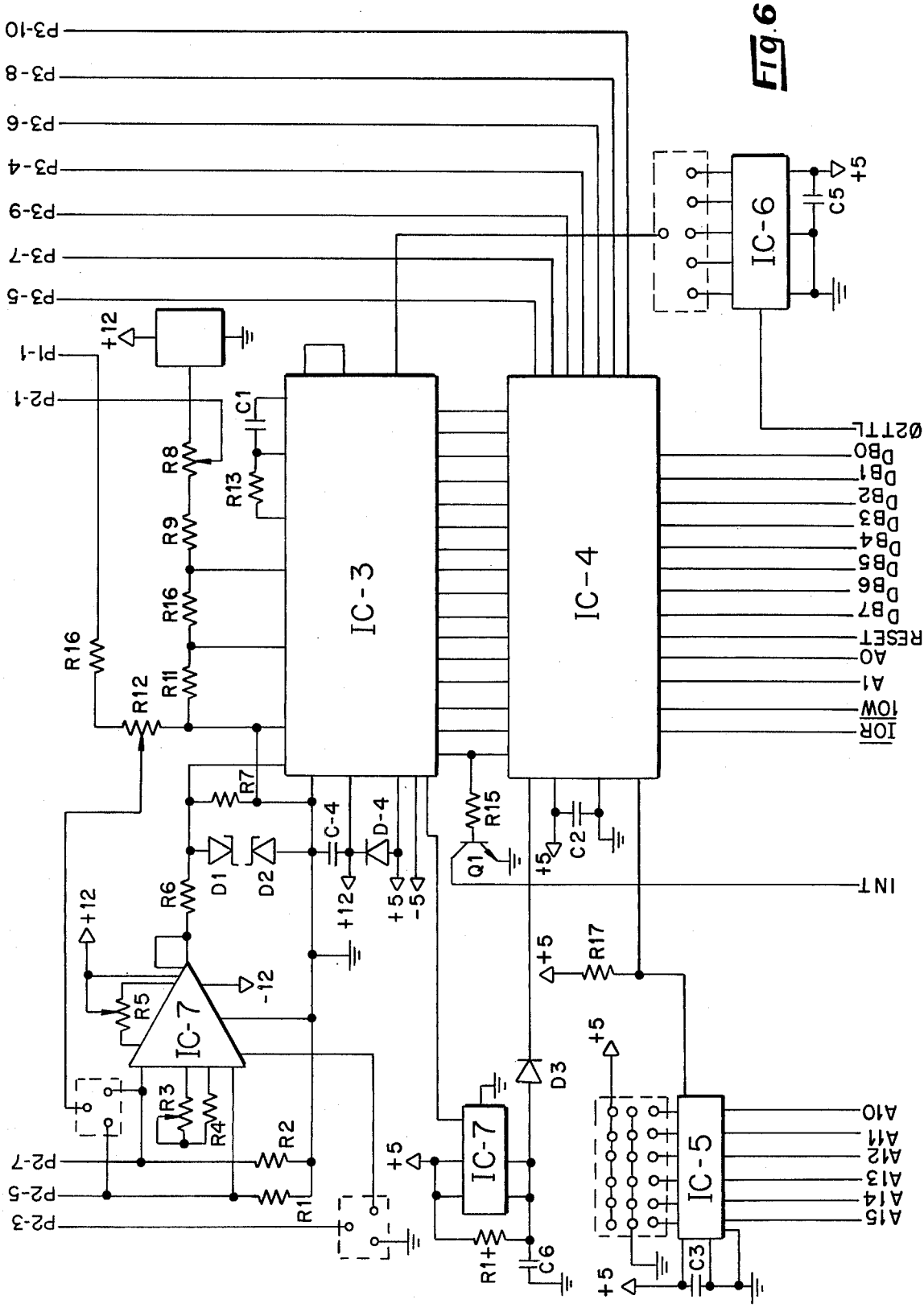
FIG. 6 is a circuit diagram of one embodiment of an analog to digital convertor employed in the present system.
Figure 7:
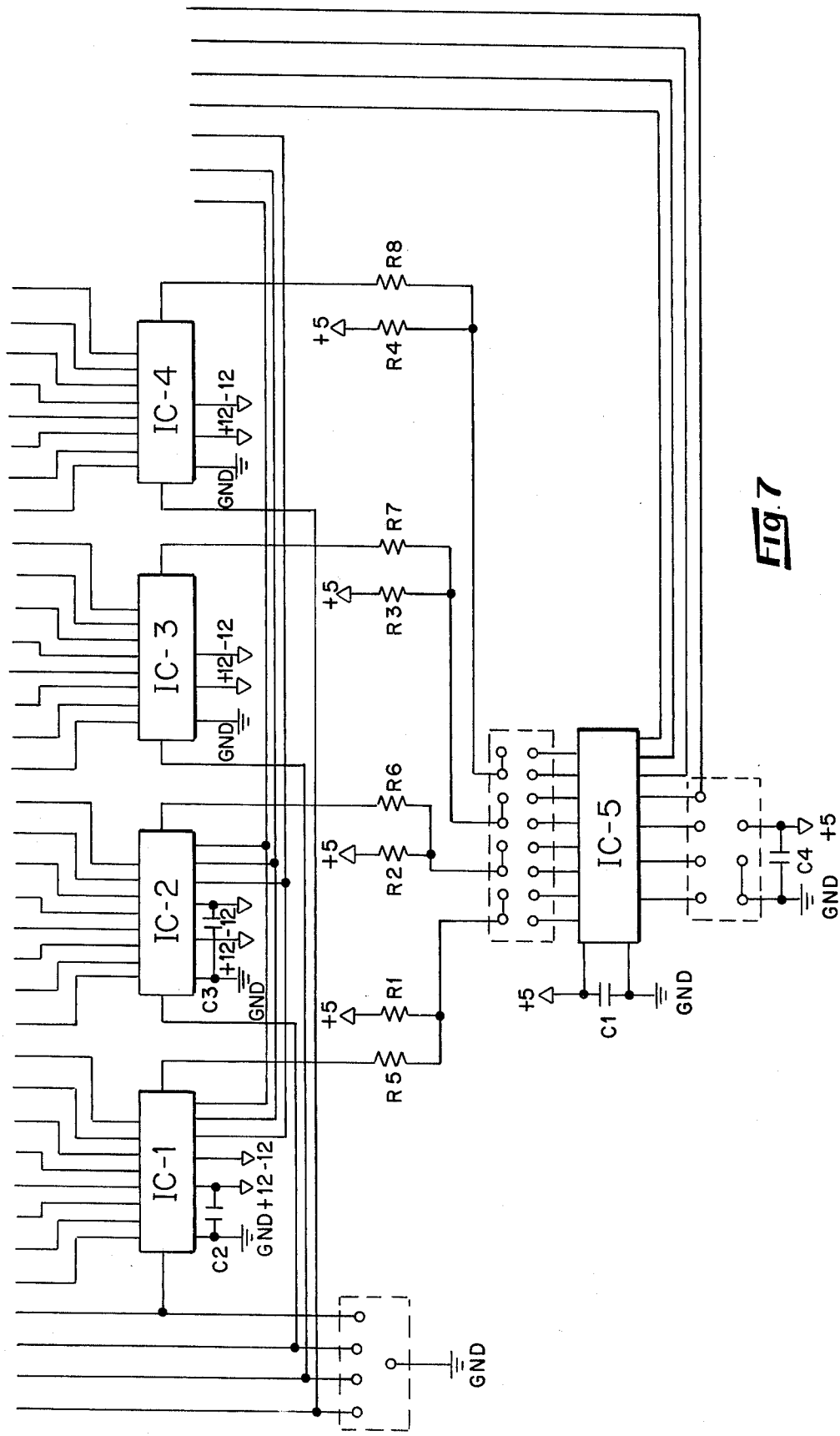
FIG. 7 is a circuit diagram of one embodiment of an analog multiplexor employed in the present system.
Figure 8:
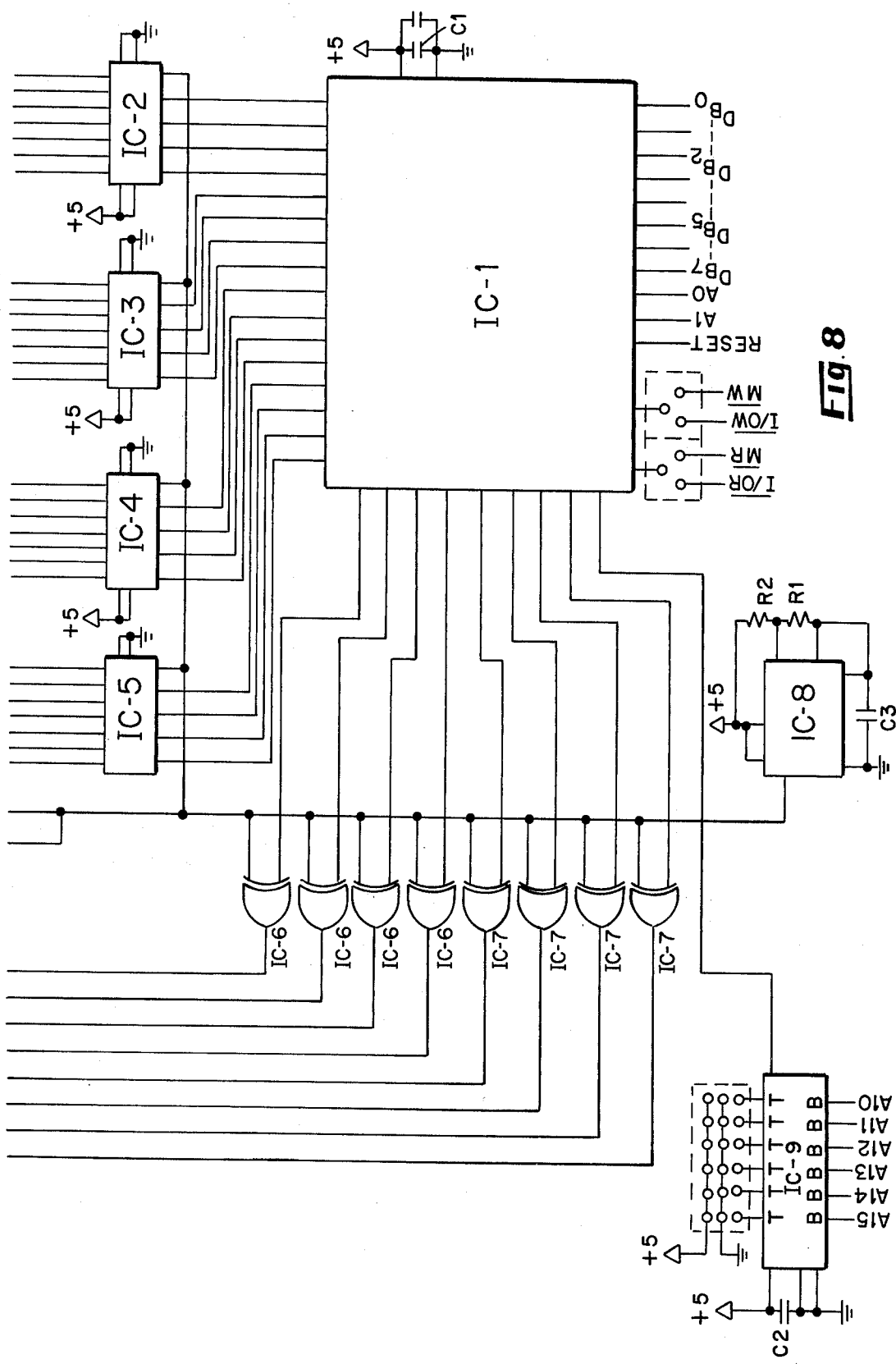
FIG. 8 is a circuit diagram of one embodiment of a display employed in the present system.

Referring now to FIG. 1, in a preferred embodiment of the present system, there is provided a plurality of platinum resistor probes 10 and 12 such as a Rosemont 78 series resistance temperature detector (RTD), commercially available from Rosemont Engineering Company, Minneapolis, Minn. Each of the probes is provided with four wires 14, 16, 18 and 20, two of the wires of each probe being connected through a multiplexor 22 to a source of constant current 24. The other two wires of the probe are connected through the multiplexor to the leads 26 and 28 of an amplifier 30. The second of the platinum probes are likewise connected through the multiplexor by two of its wires to the constant current source and by the other two of its wires to the amplifier. The multiplexor is further connected by leads 32, 34, 36 and 38 to a standard resistor 40 and through leads 42, 44, 46 and 48 to a second standard resistor 50. It will be recognized that the multiplexor referred to in FIG. 1 is of conventional design, its function in the present system being to selectively introduce into the system each of the plurality of probes, thereby providing for measuring the temperature at the spaced apart locations where the probes are located. In like manner, the multiplexor selectively introduces into the system one of the standard resistors in lieu of a probe, such fixed resistance and its significance being referred to hereinafter. In the present instance, a suitable multiplexor circuit is shown in FIG. 6, and comprises an analog multiplexor which switches the current source and amplifier to one probe at a time, thereby eliminating the need for individual current sources and amplifiers for each probe. In similar manner, the multiplexor is important in the drift compensation scheme, since electronic drift has identical effects on all resistance measurements.

The amplifier in the disclosed embodiment comprises a Model AD 522 available from Analog Devices of Norwood, Mass. This amplifier serves to receive and amplify the voltage from each of the probes. The output signal from the amplifier is analog in nature and, therefore, subject to inherent inaccuracies due to its time dependency and aging so that in the preferred embodiment, the output from the amplifier is connected through lead 54 to an analog to digital converter 56, such a Model AD 7550, available from Analog Devices of Norwood, Mass. Within the analog to digital converter, the output signal from the amplifier is digitized each time the current source is switched to a probe and sufficient time has elapsed for transients to settle. The illustrated analog to digital converter has a thirteen bit accuracy allowing a resolution equivalent to a temperature resolution of better than 0.01° C. The digitized signal is fed from the analog to digital converter through lead 58 to a microprocessor 60.

Figure 2:
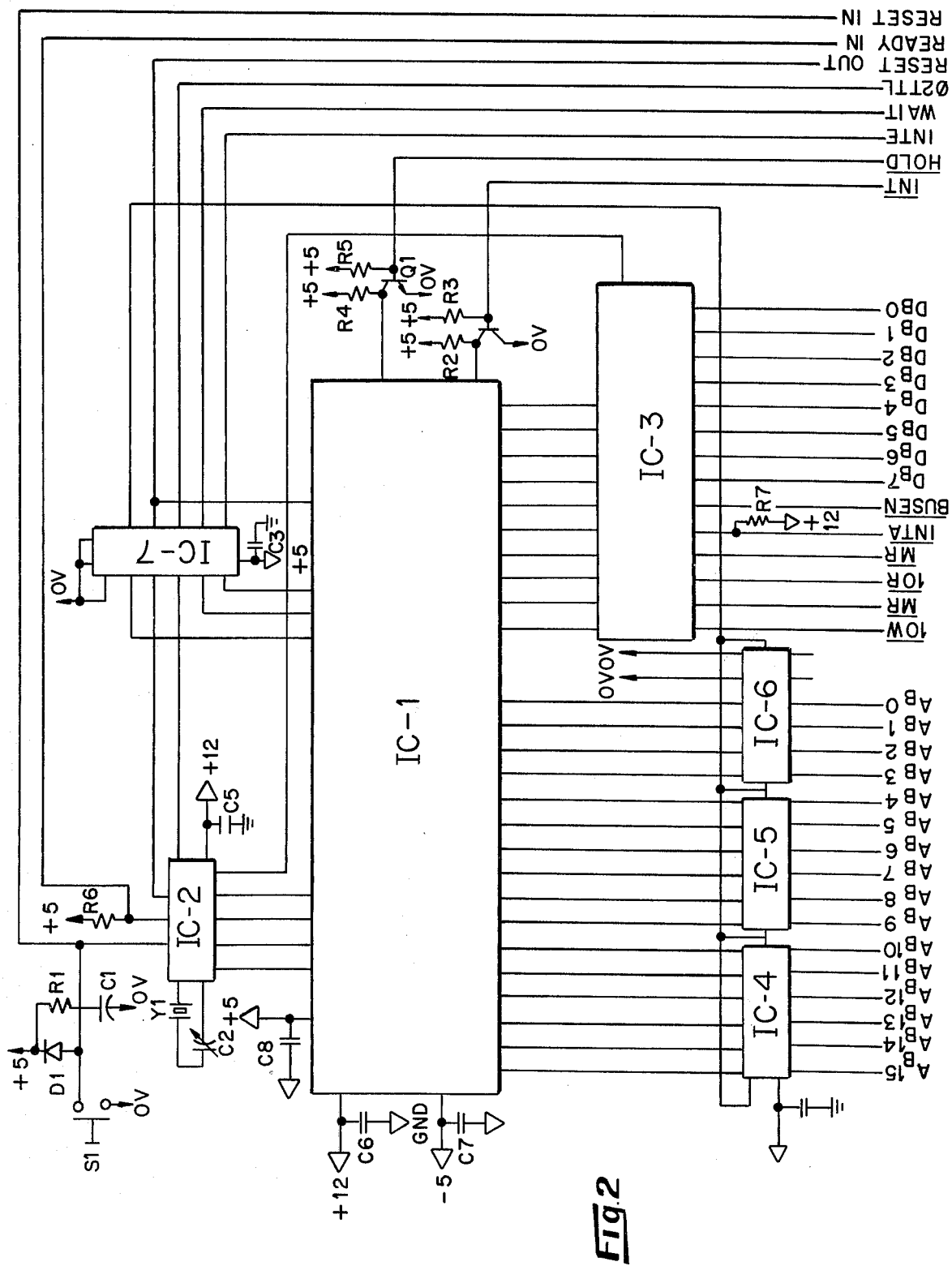
FIG. 2 is a circuit diagram of one embodiment of a central microprocessor employed in the present system.
Figure 3:
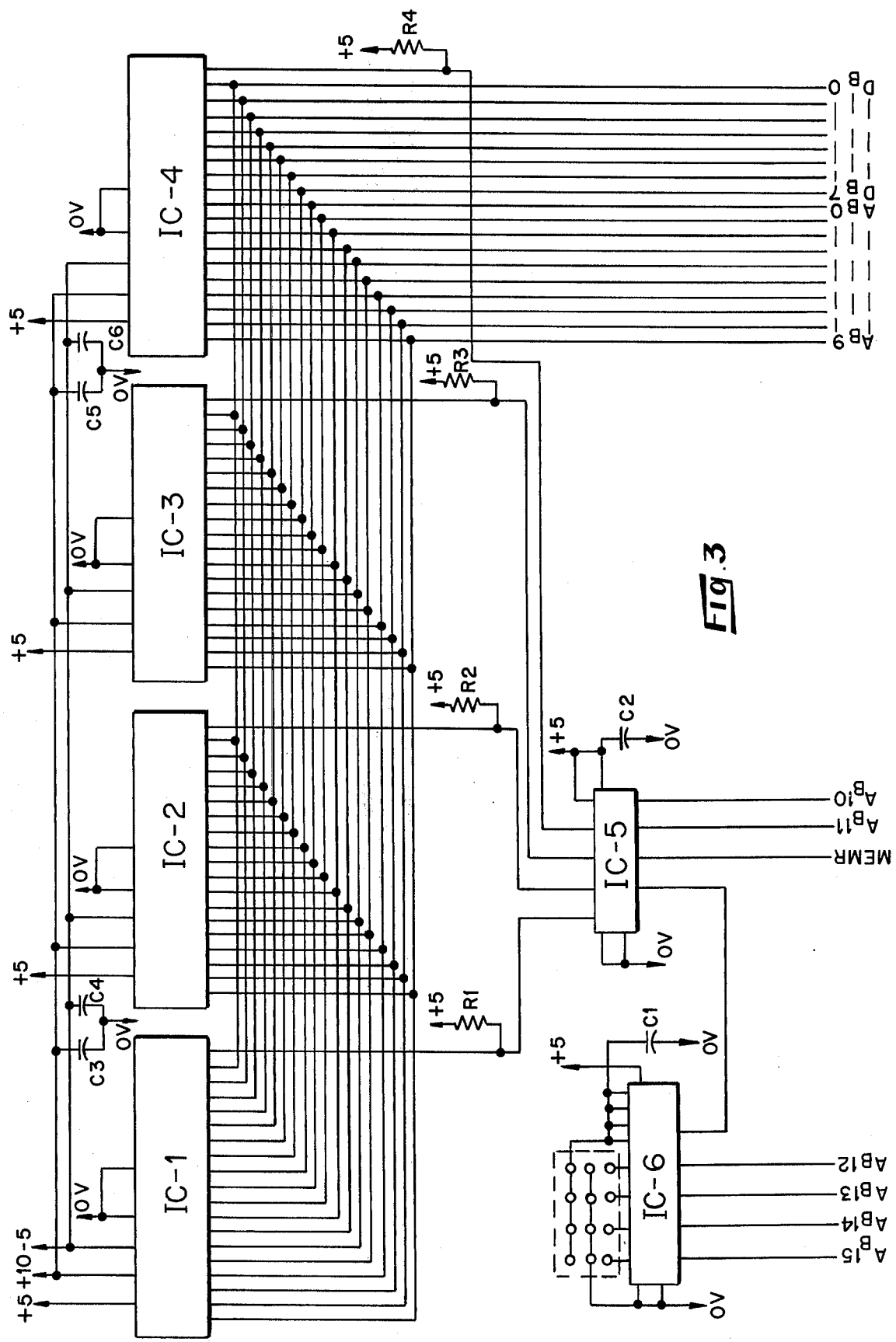
FIG. 3 is a circuit diagram of a read only memory for use with the microprocessor shown in FIG. 2.
Figure 4:
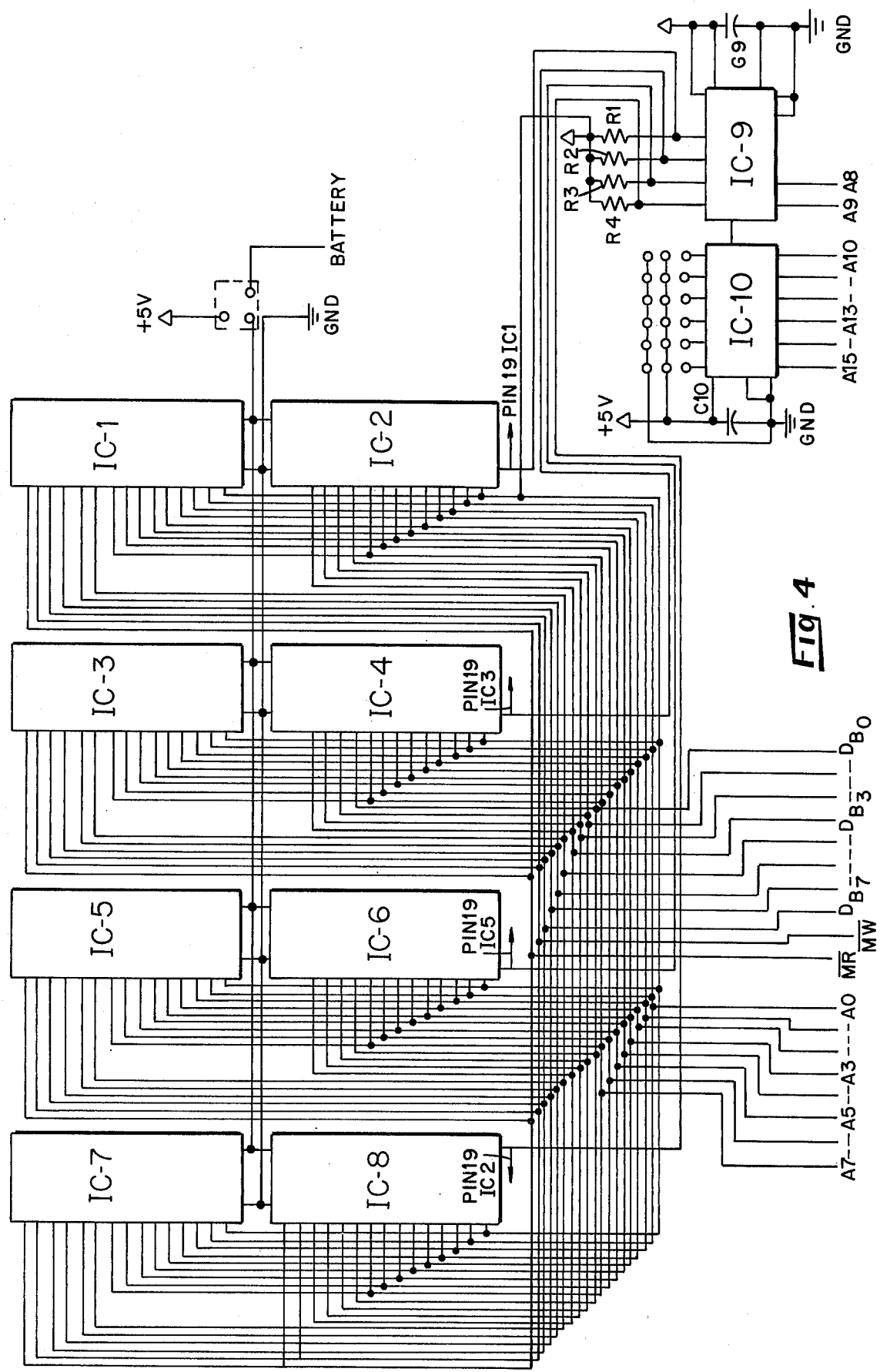
FIG. 4 is a circuit diagram of a random access memory for use with the microprocessor shown in FIG. 2.
Figure 5:
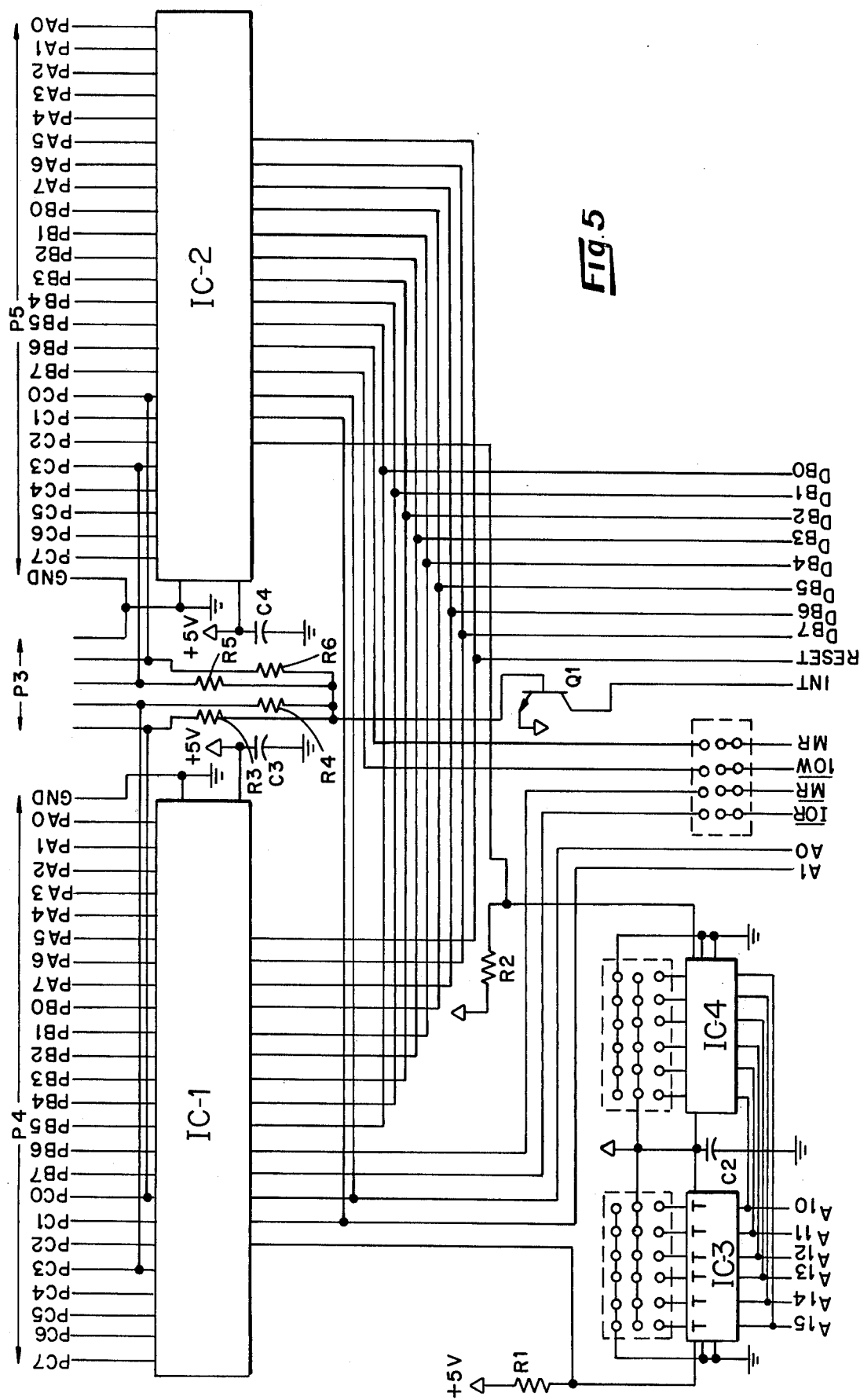
FIG. 5 is a circuit diagram of one embodiment of an input/output employed in the microprocessor shown in FIG. 2.

In the depicted embodiment, the microprocessor comprises four separate printed circuit boards, (a) a central processor (CPU) (FIG. 2), (b) a read only memory (ROM) (FIG. 3), (c) a random access memory (RAM) (FIG. 4), and (d) an input/output card (I/O) (FIG. 5). In this embodiment, the ROM 62 contains all program instructions. The RAM 64 contains mainly intermediate results in the resistance to temperature conversion computations. The input/output 65 interfaces the CPU with all controls (switches), and the LED display.

In the present instance, the microprocessor is programmed with an algorithm suitable for converting the resistance of each of the probes to the temperature in degrees Celcius. This is accomplished in the present instance employing an algorithm which closely approximates the Callendar Van Dusen equation, namely:

$$R_T = R \cdot [1 + \alpha T + \alpha \delta T \times 10^{-2} - \alpha \delta T^2 \times 10^{-4}] \quad \text{(Eq. 1)}$$

where
- $R_T$ = resistance, in ohms, of probe at the temperature under observation
- $R \cdot$ = resistance, in ohms, of probe at a known temperature (ice point of water in present instance)
- $T$ = temperature in degrees Celcius (° C.)
- $\alpha$ = constant = 0.00385 ohms/ohm ° C., nominal
- $\delta$ = constant = 1.49, nominal The output from the microprocessor is displayed employing a conventional LED display 66. In a two probe system, a preferred display is a 4½ digit LED display.

The present inventor has found that if one is to measure temperature with an accuracy to within about ± 0.01° C., it is inadequate to merely observe the resistance of a platinum resistor and then convert this resistance to temperature, regardless of the formula applied. Rather, it has found that electrical compensation be made for system inaccuracies. To this end, the inventor provides means for monitoring the variance of the value of the constant current source from its predetermined value and for developing an input signal to the microprocessor which is representative of such variance. Commonly, the variance, if any, is due to electronic component aging or thermal effects. Within the microprocessor, the incoming $R_T$ signal is compensated for any such variance in the current source.

Still further, in the analog to digital convertor of the present system there is a possibility of the instrument "drifting" from its zero base and/or from its full scale base, over the time between use periods of the instrument. Accordingly, the present invention provides means for electronically monitoring the drift of the ADC from each of its zero and full scales bases and developing a further input signal or signals to the microprocessor representative of such drift whereby the incoming $R_T$ signal to the microprocessor is further compensated for such drift, if any. By these means, the inventor eliminates from the resultant temperature indication the potential error arising from system inaccuracies.

In addition to the enhanced accuracy afforded in the temperature measurement by the present system, there is also an added benefit arising from the ability of a relatively inexperienced operator to rapidly and accurately calibrate the system, including the probes. More specifically, when a probe is first installed in the system, the probe is calibrated by inserting it in an ice bath of a known temperature. The read out on the LED display is observed and the specific $R\cdot$ of the probe is introduced to the system by means of encoding dip switches until the display reads 0° C. This compensates for manufacturing tolerances in $R\cdot$. Thereafter, the same probe is subjected to an elevated temperature, e.g., is inserted in boiling water, and the displayed temperature is observed. Again, a separate set of dip switches is encoded until the display reads the actual boiling point of water. This compensates for manufacturing tolerances in alpha ($\alpha$).

When the system is in use, complete system calibration is achieved by first subjecting both probes to a precisely known temperature, close to 0° C., and adjusting the dip switches to encode the $R\cdot$ value for both probes such that the display for each probe is 0° C. Next, both probes should be exposed to a precisely known temperature in the upper portion of the anticipated range, and the dip switches for each of the probes are encoded to set the $\alpha$ value for each of the probes. Since the $\alpha$ adjustment does not have any effect on the reading at 0° C., as seen from equation 1, this simple calibration is readily accomplished in the two steps.

The disclosed system has provision for accommodating probes having an $R\cdot$ of 100 ohms ± 0.2 ohms and an of 0.00385 ± 0.00003. The correct constants $R\cdot$ and $\alpha$ are encoded in dip switches of conventional design.

In a multiple probe system, if it is desired to replace only one probe, it is sufficient to match the new probe to the remaining one. This is accomplished in the present system by first subjecting the old and the new probes to an identical temperature close to 0° C. and switching in a new $R\cdot$ in the appropriate dip switch until both probes give the same temperature reading. Next, both probes should be subjected to an identical temperature in the upper portion of the desired temperature range, e.g. about 100° C. At this time, a new value can be encoded by the appropriate dip switch, until both probes give the same reading. Thus, even if one wishes to only measure the temperature at a single location, it is a desirable feature to include a second probe merely for calibration purposes, such being justified by reason of the savings in time and accuracy available from the two probe calibration concept of the present invention.

It will be recognized that variables other than the $R\cdot$ and/or $\alpha$ value found in Equation 1 may exist in the algorithm employed. Such other or additional values commonly can be compensated for in substantially the same manner as referred to herein in connection with the alpha value found in Equation 1.

Figure 10:
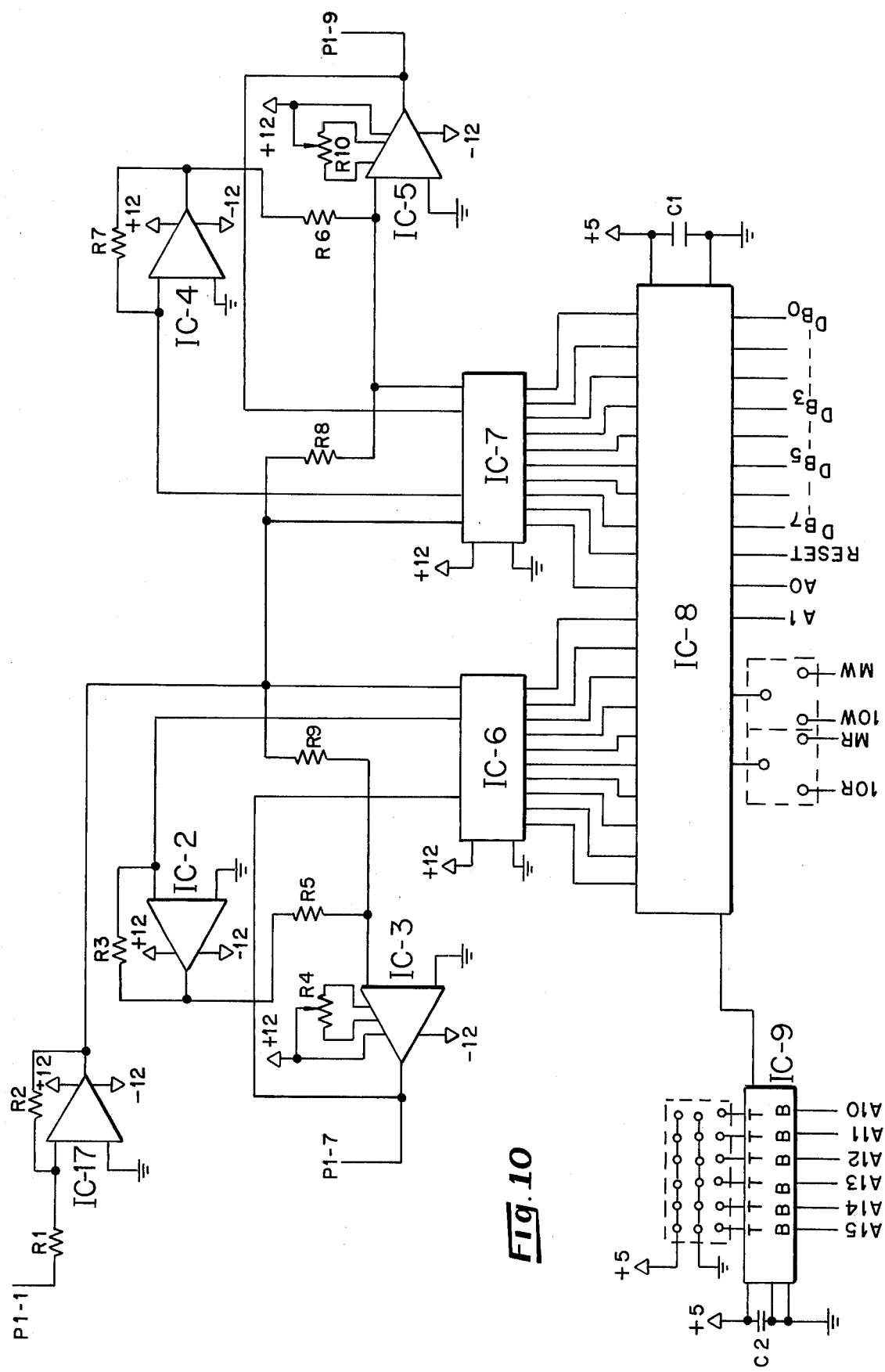
FIG. 10 is a circuit diagram of one embodiment of an alternative digital to analog convertor for providing an electrical output in analog form that is representative of temperature.

Alternatively, as desired, provision may be made, such as the digital to analog convertor shown in FIG. 10, for providing an electrical output in analog form which is representative of the measured temperature.

Referring to the Figures, the following Tables provide commercial designations and/or electrical nomenclature for various of the components shown in the Figures.

TABLE I
AMUX CARD (FIG. 7)

| Designation | Description |
|---|---|
| IC1-4 | Integrated Circuit, AD7503JD |
| IC5 | 74LS138 |
| R1-4 | Resistor, 1kΩ |
| R5-8 | 10Ω |
| C1-4 | Capacitor, 0.1μF, 50V |
| P1,2 | Connector, 3M# 3491-2002 |
| P3,4 | 3M# 3431-1002 |

TABLE II
A/D CARD (FIG. 6)

| | |
|---|---|
| IC1 | Integrated Circuit, AD522C |
| IC2 | AD2700L |
| IC3 | AD7550 |
| IC4 | Intel C8255 |
| IC5 | DM8131 |
| IC6 | MC14024 |
| IC7 | NE 555 |
| Q1 | Transistor, 2N3904 |
| D1, 2 | Diode, 2N4730 |
| D3 | 1N4148 |
| D4 | 1N4006 |
| R1 | Resistor, 20kΩ, 1% |
| R2 | 1kΩ, 1% |
| R3 | 5kΩpot |
| R4 | 100kΩ, 1% |
| R5 | 10kΩ pot, 3007P |
| R6 | 1.46kΩ, 1% |
| R7 | 2.74kΩ, 1% |
| R8 | 1kΩ pot. |
| R9 | 40.2kΩ, 1% |
| R10,11 | 5.62kΩ, 1% |
| R12 | 1kΩpot |
| R13 | 3.3MΩ |
| R14 | 1.2MΩ |
| R15 | 10kΩ |
| R16 | 10kΩ, 1% |
| R17 | 1kΩ |
| C1 | Capacitor, 5000pF, Polystyrene |
| C2-5 | 0.1μ F, 50V |
| C6 | 0.07μ F, 50v |
| C7,8 | 10μ F, 25V |
| P1-14 3 | Connector, 3M# 3491-2002 |

Figure 9:
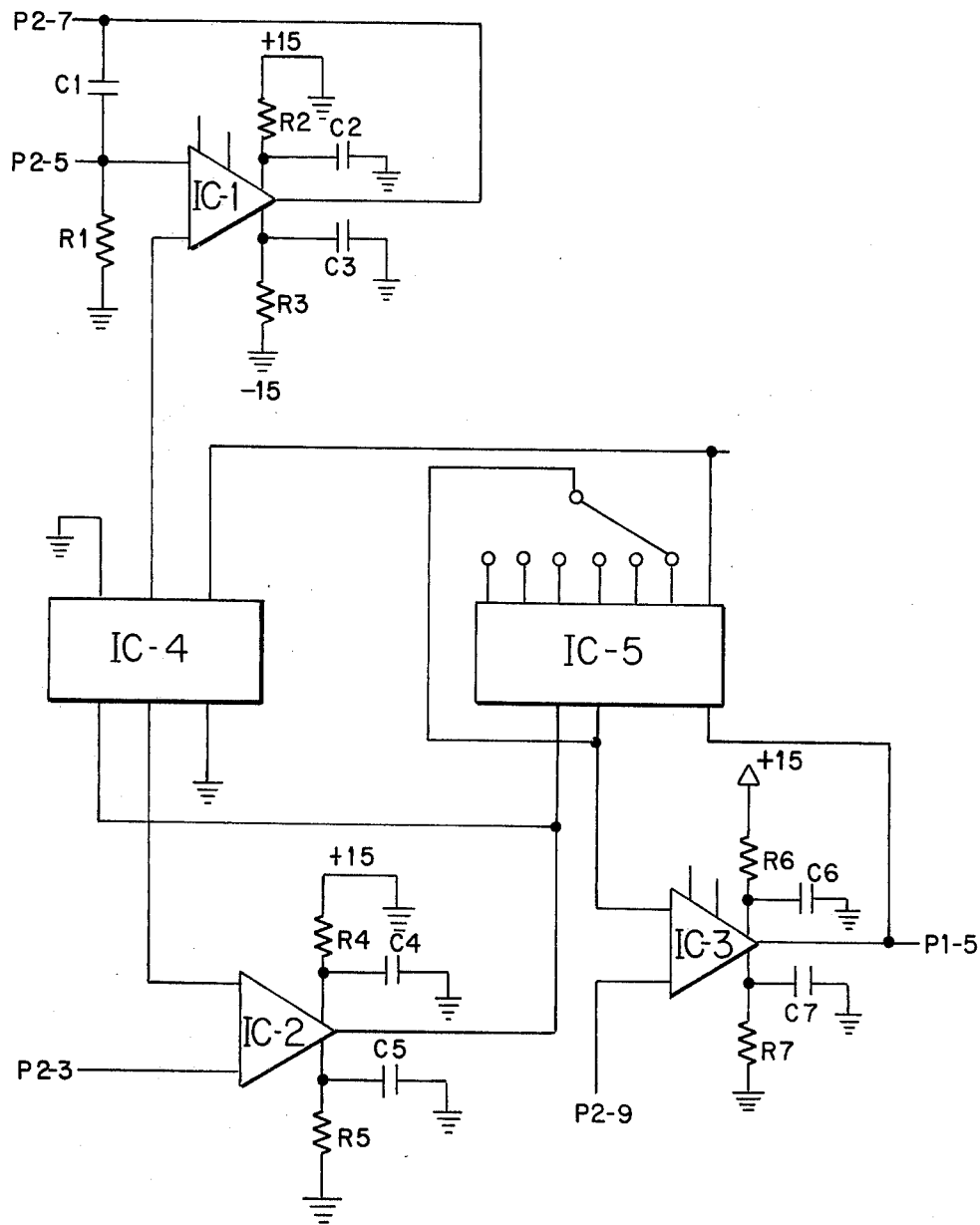
FIG. 9 is a circuit diagram of one embodiment of a constant current source employed in the present system.

TABLE III
RTDS CARD (Fig. 9)

| | |
|---|---|
| IC1-3 | Integrated Circuit, Mono OP-07CJ |
| IC4,5 | AD1841 JD/10k |
| R1 | Resistor, 100Ω, Metal film, RN55 |
| R2-7 | 10Ω |
| C1 | Capacitor, 0.1μ F, 50V |
| C2-7 | 0.01μ F, 50V |
| P1,2 | Connector, 3M# 3491-2002 |

TABLE IV
CPU CARD (FIG. 2)

| Designation | Description |
|---|---|
| IC1 | Integrated Circuit, Intel C8080A |
| IC2 | Intel P8224 |
| IC3 | Intel P8228 |
| IC4-7 | DM8097 |
| Q1,2 | Transistor, 2N3904 |
| D1 | Diode, 1N4148 |
| R1 | Resistor, 560kΩ |
| R2-7 | 1KΩ |
| C1 | Capacitor, 1.0μ F, 50V |
| C2 | 1-30μ F |
| C3-8 | 0.1pF, 50V |
| Y1 | Crystal, Intel 18801 |

TABLE V
ROM CARD
(FIG. 3)

| | |
|---|---|
| IC1-4 | Integrated Circuit, Intel 2708 |
| IC5 | 74LS138 |
| IC6 | DM8131 |
| R1-4 | Resistor, 1kΩ |
| C1-7 | Capacitor, 0.1μ F, 50V |

TABLE VI
RAM CARD
(FIG. 4)

| | |
|---|---|
| IC1-8 | Integrated Circuit, Intel P8101A-4 |
| IC9 | 74LS138 |
| IC10 | CM8131 |
| R1-4 | Resistor, 1KΩ |
| C1-10 | Capacitor, 0.1pF, 50V |

TABLE VII
I-O CARD
(FIG. 5)

| | |
|---|---|
| IC1,2 | Integrated Circuit, Intel C8255 |
| IC3,4 | DM8131 |
| Q1 | Transistor, 2N3904 |
| R1,2 | Resistor, 1kΩ |
| R3-6 | 10kΩ |
| C1-4 | Capacitor, 0.1μ F, 50V |
| P1 | Connector, 3M# 3491-2002 |
| P2,3 | 3M# 3429-1002 |

TABLE VIII
REFR CARD

| | |
|---|---|
| R1-R8 | Resistors, wirewound 0.01%, 5 ppm |
| R9-16, R25-R28 | Resistors, Metal film, RN55C |
| R17-R24, R29-R32 | Potentiometers, 10 turn, 3007P |
| P1, P2 | Connector, 3M #3431-1002 |
| P3 | Connector, 3M #3491-2002 |

As noted above, in an operation of the system, after the probes are installed and "calibrated" for R. and α, each of the probes is disposed at the location of the desired temperature measurement. Equilibrium of the probe temperature with the ambient temperature occurs momentarily and can be monitored by the present system by reason of the rapid response of the system that provides an essentially instantaneous display of the temperature of the probe.

The resistance of the probe alters the value of the voltage across the probe developed from the constant source, such resistance being a function of the temperature of the probe. This altered voltage, which is proportional to $R_T$, is fed to the amplifier where it is amplified and fed to the analog to digital convertor. The digital signal output of the ADC is fed to the microprocessor along with signals representative of variances of the constant current source and the zero and full scale bases of the ADC. The $R_T$ signal is compensated for such variances, if any, and processed employing the algorithm which closely approximates the Callender Van Dusen equation for converting platinum resistance values to degrees Celcius. The output from the microprocessor is displayed in the illustrated embodiment. Such output signal, if desired, can be used for various purposes such as for process control.

While a preferred embodiment has been shown and described, it will be understood that there is no intent to limit the invention by such disclosure, but rather, it is intended to cover all modifications and alternate constructions falling within the spirit and scope of the invention as defined in the appended claims.

What is claimed:

1. A system for accurately measuring the temperature at a plurality of spaced apart locations comprising a plurality of platinum resistance probes one of which is located at each situs of temperature measurement, a source of constant current of a predetermined value, means connecting said current source in electrical communication with each of said probes, amplifier means, multiplexor means interposed in electrical communication between said probes and said amplifier means whereby each of said probes is selectively connected in electrical communication with said amplifier means, analog to digital convertor means, means connecting said amplifier means in electrical communication with said analog to digital connector means, microprocessor means, means connecting said analog to digital convertor means in electrical communication with said microprocessor means, display means, means connecting said display means in electrical communication with said microprocessor means, means for selectively developing a digital representation of a variable probe parameter and introducing the same to said microprocessor, means monitoring said source of constant current and developing an electrical signal representative of the variance of said current source from its predetermined value and feeding said signal to said microprocessor, means monitoring the drift of said analog to digital convertor from its zero and full scale bases and developing electrical signals representative of such variances and feeding said signals to said microprocessor, whereby the electrical resistance of each of said probes is selectively monitored, converted to its corresponding temperature equivalent and displayed.

2. The system of claim 1 including first and second fixed known standard resistances, means connecting said resistances in electrical communication with said multiplexor means whereby each of said fixed resistances is selectively connectable into said system in lieu of one of said probes.

3. The system of claim 1 including means monitoring the drift of said analog to digital convertor means from its zero and full scale bases and developing an electrical signal representative of such variance, and means communicating said signal to said microprocessor as an input signal thereto for compensating for such drift.

4. The system of claim 1 including a plurality of dip switches individual ones of which when introduced into said system provide to said microprocessor a digital representation of a variable probe parameter.

5. A system for accurate temperature measurement comprising in combination a platinum resistance whose electrical resistance varies with its temperature, a source of relatively constant current of a predetermined known value, at least two electrical leads connecting said platinum resistance in series with said current source, amplifier means, at least two electrical leads connecting said platinum resistance in electrical communication with said amplifier means whereby when said constant current is impressed through said platinum resistance an electrical signal is developed that has a voltage value proportional to the value of said constant current times the then existing resistance value of said platinum resistance and said altered electrical signal is fed to said amplifier and amplified to develop an output signal in analog form, an analog to digital convertor means, means connecting said amplifier in electrical communication with said analog to digital convertor means, microprocessor means, means connecting said analog to digital convertor means in electrical communication with said microprocessor means in electrical communication with said display means, means electrically connecting said source of constant current to said microprocessor means whereby the value of said current source becomes an input signal to said microprocessor means and said microprocessor monitors said current value and compensates for any variance of said current from its predetermined value in any processing within said microprocessor of said signal from said analog to digital convertor, means monitoring the drift of said analog to digital converter from its zero base and providing to said microprocessor an input signal representative of such drift, means monitoring the drift of said analog to digital convertor from its full scale base and providing to said microprocessor an input signal representative of such drift, means for selectively developing a digital representation of a variable probe parameter and introducing the same to said microprocessor.

* * * * *